TAPE RECORDERS

Filed Nov. 18, 1957

Inventor
L. Namenyi-Katz
By Glascock Downing & Seebold
Attys.

United States Patent Office 2,960,611 Patented Nov. 15, 1960

2,960,611

TAPE RECORDERS

Laszlo Namenyi-Katz, London, England, assignor to Epsylon Research and Development Company Limited, Feltham, England Filed Nov. 18, 1957, Ser. No. 697,094

5 Claims. (Cl. 250—222)

Figure 1:
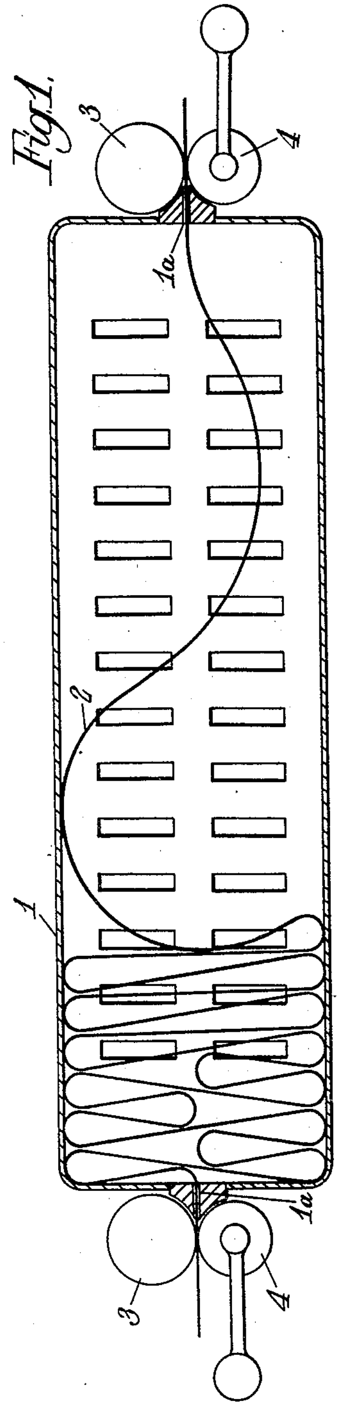

This invention relates to tape recorders.

In certain types of tape recording apparatus it is essential that the tape transmission may be started and stopped within a very short duration of time. The duration of time, however, within which the tape transmission may be accelerated is dependent on the acceleration of the mass involved in the tape storage reels. This limitation will allow the tape transmission to be started and stopped within a time of the order of, say, half a second. In some cases, however, this time should be very much shorter and in fact should be of the order of 2–1 milliseconds. As it is not possible to accelerate and decelerate the tape reels themselves at a rate sufficient to achieve such a time it is desirable to provide a magazine into which tape is loosely fed and from which tape is removed so that the tape transmission may be started and stopped in this short time and the stored volume of tape inside the magazine will be able to feed the capstan which is transmitting the tape while the tape spool in either direction is being speeded up to the required speed.

With this kind of magazine it becomes necessary both to have and maintain sufficient tape in the magazine to allow for the acceleration and deceleration of the tape storage reels and to remove the tape from the magazine when more than the desired amount becomes stored there.

To arrange for this it is necessary to measure the amount of tape in the magazine and to provide means for switching on or off the magazine loading or unloading means in accordance with the measured amount of tape in the magazine.

Various means of doing this have been proposed and the present invention is concerned with an arrangement for doing so which employs a magazine of the free loop type.

This type of magazine comprises a box generally rectangular having a throat at each end to which tape can be fed or removed. Within the box the tape fills up the space by folding itself to form one or more loops depending on the amount of tape in the box. The loops may all extend from side to side of the box or some may be shorter and lie to one side or the other, or in a central position.

The present invention consists of an arrangement for measuring the amount of tape in a magazine of the type described comprising means for transmitting electro-magnetic waves into the magazine in such a way that the component interrupted by the tape will vary according to the amount of tape in the magazine and means for measuring the amount of electro-magnetic waves transmitted through the magazine.

Preferably the electro-magnetic waves are light, which may be transmitted into the magazine in a direction which lies in a plane through the transverse direction of the tape in the magazine and inclined to the transverse direction.

The waves may all be transmitted through the magazine in the same direction or the magazine may be considered as sectionalised and the waves for each section measured separately.

Thus the waves which are likely to be intercepted by the ends of the loops of tape at the side of the magazine may be arranged to be in different direction to those which are likely to be intercepted by the tape lying at the centre part of the magazine.

The invention will be further described with reference to the accompanying drawings accompanying the provisional specification.

Figure 1 is a horizontal section and

Figure 2:
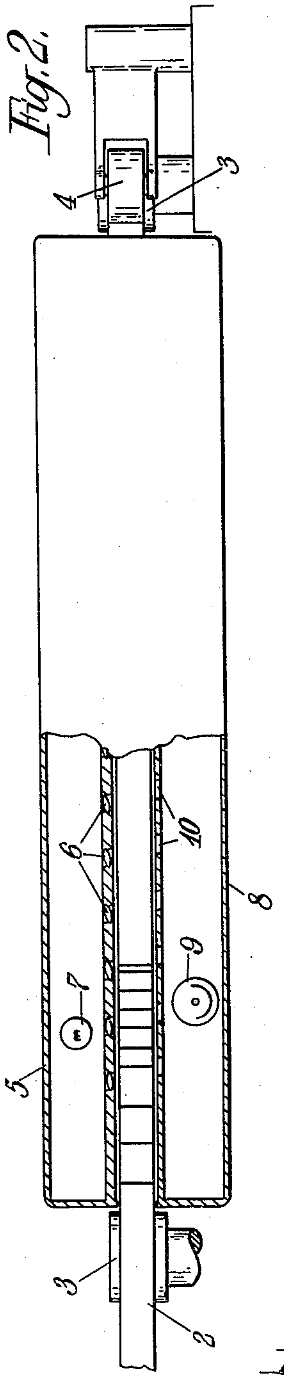

Figure 2 a vertical section of an embodiment of the invention.

Figure 3:
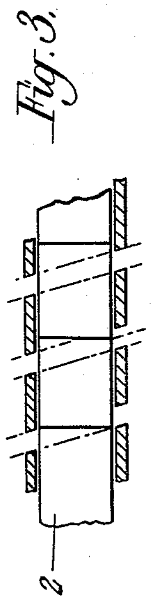

Figure 3 is an enlarged detail of part of Figure 2 showing the passage of the light beams.

In the embodiment of this invention shown in the drawings, the magazine 1 is constructed to be of oblong shape and with its internal height just sufficient to accommodate the width of the tape so that when the tape is lying on its edge pushed into the magazine and it is bent or folded, it will fold into a fairly regular layer in a zig-zag fashion. The width of this oblong magazine would be so chosen that the folds of tape will be conveniently achieved by the tape's flexibility. The length of the magazine is then determined by the volume of tape that may be required to be stored to provide sufficient delay. The opening 1*a* at each end of the magazine is so placed that the tape will be easily fed by pushing it through the opening by the turn of the closely placed capstan 3 and pinch roller 4. The feeding-in may be improved by stiffening the tape temporarily by bending it in vertical direction as it passes through the opening 1*a*. The tape may be fed into the magazine from either end (or may be removed from it from either end) and the tape will be so folded inside the magazine that the folds lie generally across the direction whence it is fed. The measurement of the volume of tape inside the magazine is then achieved by the following means. The top 5 of the magazine is transparent and fitted with a number of slots placed at right angles to the axis of the magazine. Groups of these slots are parallel with each other at regular intervals all along the top of the magazine. In each slot, a suitable designed lens 6 is so situated as to provide a narrow beam of light converging at the bottom of the magazine, or a narrow parallel beam, from a light source 7. The beams are directed not vertically downwards, but at a suitable angle so that if a fold of tape is placed in the path of any beam the beam is partially or wholly obscured in accordance with its position in relation to the slot.

The bottom of the magazine contains photo-electric bottom cells 8 of convenient shape to cover the whole of the magazine and slots are disposed to pass the light to the photo-electric cells 9.

When the magazine is loaded with tape to a certain level, a certain number of light beams will be stopped from reaching the photo-sensitive lid and the quantity of light will be reduced correspondingly to the number of layers of tape fed into the magazine.

It may be seen that by the means described above, an accurate measurement may be achieved and the volume of tape loaded into the magazine may be accurately assessed. Further means then may be provided which will register the output of the photo-cell, and according to preset levels will switch on and off the magazine loading or unloading means, so as to retain the magazine loaded with tape at the required level to provide the delay in both cases; when the tape is fed into the magazine from the tape transmitting capstan, or removed from it, and in either case the tape storing reel will allow tape to be replaced in the magazine, or will remove tape in accordance with the direction in which the capstan may be driven.

Various modifications may be made within the scope of the invention. Thus to achieve smooth motion of the tape, the slots may be covered by a glass plate, and to simplify the construction a number of cylindrical or other lenses may be bedded at regular intervals into the top plate and then illuminated either from point sources which may be obtained through identical slots of a second screen, and focussed or projected by the lenses onto the bottom of the magazine.

I claim:

1. In a magnetic tape recorder having at least one reel of magnetic tape, a magnetic head and means to transport said tape from said reel past said magnetic head, a magazine through which said tape is passed from end to end in a series of loose irregular loops formed by said tape as it is fed into the magazine, a source of electromagnetic waves disposed on one side of the plane in which said loops lie and arranged to project electromagnetic waves through said loops at an oblique angle to the line of movement of said loops through said magazine, said electromagnetic waves being of a type whose passage is affected by the presence of said loops in their path, and detector means responsive to said electromagnetic waves disposed on the other side of said plane, whereby the response of said detector means is dependent upon the number of said loops which is packed within the length of said magazine.

2. In a magnetic tape recorder containing magnetic tape, a magnetic head and means to traverse said tape past said head, a magazine through which said tape is traversed from end to end in a series of loose loops formed by doubling said tape back upon itself alternately in opposite directions, a plurality of lamps disposed on one side of the plane in which said loops lie, said lamps being disposed along a line parallel to the direction of movement o said series of loops through said magazine, lens means associated with each lamp to direct a beam of light therefrom through said loops at an oblique angle to said line, and photoelectric means associated with each lamp disposed on the other side of said plane to receive said beam after it has passed through said series of loops, whereby the total response of all said photoelectric means is dependent upon the length of tape formed into said series of loops in said magazine.

3. An arrangement as claimed in claim 1 in which the source of electro-magnetic waves comprises a source of light and the detector means comprises a photo-electric device.

4. An arrangement as claimed in claim 3 in which the source of light comprises a series of lamps arranged longitudinally of said magazine, there are lens means associated with each lamp to project a beam of light therefrom at said oblique angle to said line, and said detector means comprises a photo-electric cell associated with each said lamp to receive its beam.

5. In apparatus for recording upon and reproducing from magnetic tape including two tape storage reels and means to transport said tape from one reel to the other past a magnetic recording and reproducing head, a magazine located between one tape storage reel and said head through which said tape passes longitudinally from end to end in a series of loops formed by repeatedly doubling said tape back upon itself in opposite directions, a source of light disposed on one side of the plane in which said series of loops lies, a plurality of lenses between said source of light and said plane each arranged to direct a beam of light through said series of loops to the other side of said plane at an oblique angle to the line of movement of said series of loops through said magazine, and detector means responsive to light arranged longitudinally of said magazine on said other side of said plane to receive said beams of light, whereby the total amount of light reaching said detector means varies inversely with the number of said loops in said magazine.

References Cited in the file of this patent

UNITED STATES PATENTS

| | | |
|---|---|---|
| 804,306 | Fonda | Nov. 14, 1905 |
| 2,009,856 | Otis et al. | July 30, 1935 |
| 2,229,638 | Chamberlin et al. | Jan. 28, 1941 |
| 2,295,327 | Bendz | Sept. 8, 1942 |
| 2,551,198 | Barrett | May 1, 1951 |
| 2,679,394 | Lear | May 25, 1954 |